United States Patent
Costianes

[15] 3,690,234
[45] Sept. 12, 1972

[54] APPARATUS FOR TAKING PHOTOGRAPHS AT TIMES OF MINIMUM IMAGE MOTION

[72] Inventor: Peter J. Costianes, Rome, N.Y.

[73] Assignee: The United States of America as represented by the Secretary of the Air Force

[22] Filed: Jan. 18, 1971

[21] Appl. No.: 107,303

[52] U.S. Cl. ..................................95/11, 95/12.5
[51] Int. Cl. ...................................G03b 19/00
[58] Field of Search..........................95/11, 12.5

[56] References Cited
UNITED STATES PATENTS
2,413,349   12/1946   Hancock ....................95/12.5

Primary Examiner—John M. Horan
Attorney—Harry A. Herbert, Jr. and Willard R. Matthews, Jr.

[57] ABSTRACT

Image velocity detection means are incorporated into photographic apparatus and are utilized to activate the camera at a time of minimum image motion. Light from an object of interest passes through a photographic lens and is imaged on a mask having a periodic transmission. As the image moves across the mask, the total light reaching an integrating photodetector directly behind the mask varies as a function of time and image velocity. This variation sets up a proportional electric current which is analyzed to determine the instantaneous image velocity. When a minimum instantaneous velocity is detected a signal is generated which trips the camera shutter.

1 Claim, 7 Drawing Figures

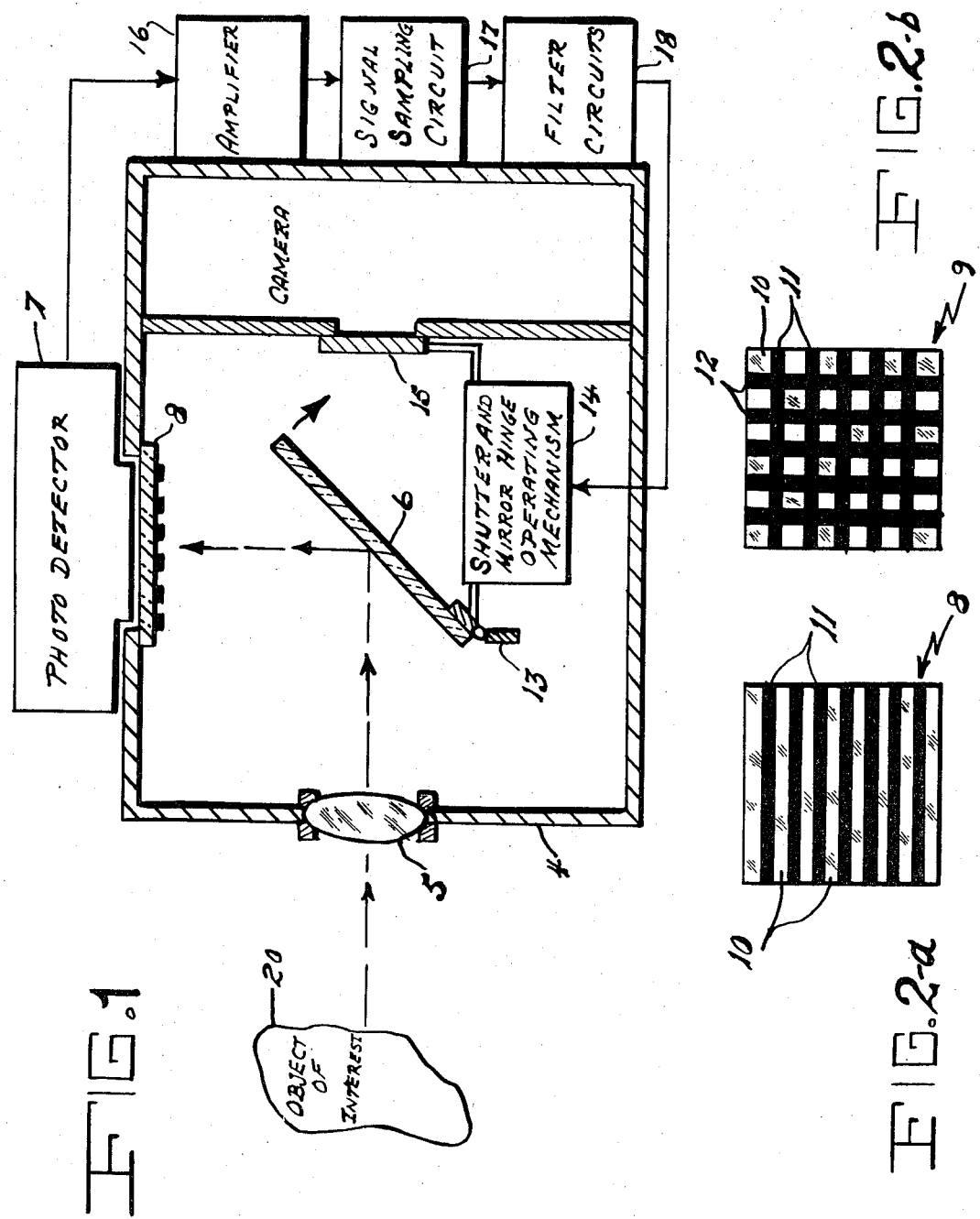

APPARATUS FOR TAKING PHOTOGRAPHS AT TIMES OF MINIMUM IMAGE MOTION

BACKGROUND OF THE INVENTION

This invention relates to photographic means and in particular to unique means for taking photographs at a time of minimum image motion.

In telephoto systems, image motion is a major cause of degradation of the recorded photographic image. Sources of image motion include atmospheric shimmer, object motion, and camera platform motion (i.e., the photographer). At a certain time in the picture taking process, there is an instant of time when the image velocity across the film plane of the camera is below a certain threshold value. This threshold value is determined on the basis of the necessary resolution requirements for the particular photograph being made. There currently exists, therefore, the need for means by which the photographic system may automatically detect when the motion is below that necessary to resolve a certain object or objects of interest. Such means should also effect the taking of a photograph once the image motion falls below the established threshold. The present invention is directed toward providing such means and accomplishing other objects as hereinafter indicated.

SUMMARY OF THE INVENTION

The invention discloses means for reducing the blurring effect caused by the velocity of an object creating an image on the film plane of a camera. Light from an object passes through a photographic lens, and is divided by a beam splitter thereby imaging the light on a mask having periodic transmission. As the image moves across the mask the total light passing through the mask will fluctuate as a function of time and velocity. The variation of light sets up an electrical signal from a photodetector which feeds its output signal to an electrical circuit having the ability to determine when the preselected minimum instantaneous velocity is reached, a shutter release signal is generated which operates the camera shutter thereby recording a photo having a minimum of blur.

It is a principal object of the invention to provide a new and improved photographic system.

It is another object of the invention to provide a photographic system including image velocity detecting means.

It is another object of the invention to provide a photographic system that is capable of monitoring image motion and taking photographs at a time of minimum image motion.

These together with other objects, features and advantages of the invention will become more readily apparent from the following detailed description taken in conjunction with the illustrative embodiment in the accompanying drawings.

DESCRIPTION OF DRAWINGS

FIG. 1 is a sectional view, partly in block diagram form of one presently preferred embodiment of the invention;

FIGS. 2a and 2b illustrate two forms of periodic transmission masks of the type used in the present invention.

DESCRIPTION OF PREFERRED EMBODIMENT

Figure 3A:
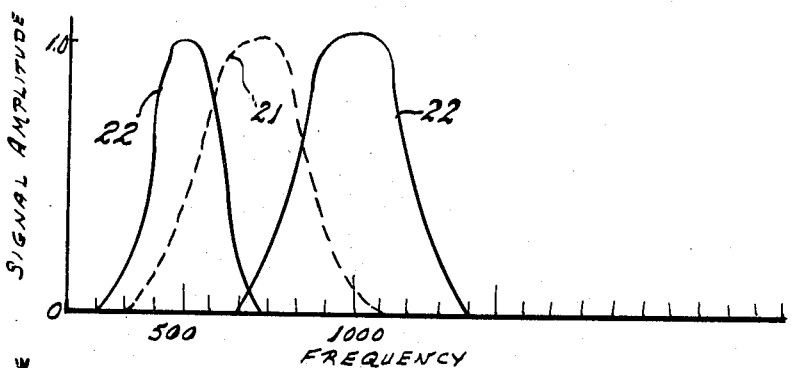
FIGS. 3a, 3b, 3c and 3d are graphs illustrating the relationships between the electronic band pass filter characteristic of the invention and system output signals representing various image velocities.

Referring now to FIG. 1 the invention can have a housing member 4 that encloses conventional camera apparatus (not shown) and includes a lens 5. Mirror 6 is positioned to direct light that passes through lens 5 to photodetector 7 through mask 8. Mask 8 is of a periodic transmission type and a detail of two different applicable embodiments of such a mask are illustrated by FIGS. 2a and 2b. Mask 8 of FIG. 2a is simply a transparent member 10 having opaque lines 11 on the surface thereof at uniform spacings. The mask 9 of FIG. 2b has in addition to uniformed spaced opaque lines 11 a second set of uniformed spaced lines 12 that effect a grid like arrangement. Other types of conventional periodic transmission optical filters are also applicable for use in this invention. Mirror 6 can be removed from its light diverting position by means of hinge 13 and operating mechanism 14. Thus when a picture is to be taken shutter and mirror hinge operating mechanism 14 rotates mirror 6 in the direction of the arrow and also operates shutter 15. Other arrangements such as a stationary partial mirror through which photographs can be taken also fall within the scope of the invention. Photodetector 7 can be any integrating photodetector that converts the total light coming through the mask into a detectable electrical signal. For example, there may be voltage fluctuations from a photo-voltaic detector or resistance fluctuations in a bolometer. Amplifier 16, signal sampling circuit 17 and filter circuit 18 comprise the electronics required to process the photodetector output signal. Such circuits are of conventional design and operate in the manner hereinafter described.

In operation, light from the object 20 passes through photographic lens 5, reflects off the reflex mirror 6 and is imaged on mask 8. As the image moves across the mask, the light reaching integrating photodetector 7 behind the mask will fluctuate as a function of time and image velocity. This variation sets up an electrical signal which can be analyzed to determine the instantaneous velocity. When a suitably low instantaneous velocity is detected, a signal is generated which trips the camera shutter.

For purposes of simplicity, the following analysis will be limited to an image whose intensity varies sinusoidally, a mask whose transmission varies sinusoidally, and linear image motion.

One plane of reference is the plane of the detector (X-Y plane). Physically, the mask is stationary; but for purposes of this description it is assumed that the mask is moving at half the actual velocity of the image with respect to the photodetector and the image is moving in an opposite direction at half its actual velocity with respect to the photodetector. The relative velocity of the image with respect to the mask, will, therefore, equal the actual velocity of the image with respect to the photodetector and actual stationary mask.

The relationship between the frames of reference of the signal (image), mask, and photo detector may be stated by:

$$X' = X - Vt \quad \text{1.}$$

$$X'' = X + Vt \quad \text{2.}$$

where
$X$ = coordinate on the photodetector frame of reference
$X'$ = coordinate on the signal frame of reference
$X''$ = coordinate on the mask frame of reference
$V$ = half the signal velocity with respect to the mask The sinusoidal signal variation may be written as $$S(X') = A_s \sin(W_s X' + 0) + D_s$$

where
$A_s$ = amplitude = $(I_{max} - I_{min})/2$
$I_{max}$ = maximum intensity
$I_{min}$ = minimum intensity
$W_s$ = spatial angular frequency
$0$ = phase at $t=0$ with respect to mask
$D_s$ = mean value of the signal or DC level = $(I_{max} + I_{min})/2$
$X'$ = coordinate in the signal frame of reference The sinusoidal mask transmission may be written as $$G(X'') = A_G \sin(W_G X'') + D_G$$

where
$A_G$ = amplitude = $(T_{max} - T_{min})/2$
$T_{max}$ = maximum transmission
$T_{min}$ = minimum transmission
$W_G$ = spatial angular frequency
$D_G$ = mean value of the mask transmission or DC level = $(T_{max} + T_{min})/2$
$X''$ = coordinate in the mask frame of reference Using coordinate transformations given in equations (1) and (2), the signal and mask expressions in the frame of reference of the detector become $$S(X,t) = A_s \sin(W_s(X-Vt) + 0) + D_s$$

$$G(X,t) = A_G \sin W_G(X+Vt) + D_G$$

For any instant of time $t$, the distribution of light on the photodetector will be the product of the signal intensity distribution, $S(X,t)$, and the mask transmission, $G(X,t)$, or $$R(X,t) = S(X,t) G(X,t) \quad \text{3.}$$

Since the photo detector will integrate all the light at an instant of time $t$, the electrical signal will be proportional to the integral $$R(t) = \int R(X,t) \, dx$$

Substituting the expression for $S(X,t)$ and $G(X,t)$ into equation (3), $$R(X,t) = [A_s \sin(W_s(X-Vt) + \Phi) + D_s]$$
$$[A_G \sin(W_G(X+Vt)) + D_G]$$

Multiplying out and taking an integral with respect to $x$, $$R(t) = {}^{X_0}\!\int_0 R(X,t)\, dx = R_1(t) + R_2(t) + R_3(t) + R_4(t)$$

where $$R_1(t) = \frac{A_s A_G}{-2} \left[ \frac{\sin A_1 - \sin A_0}{W_s + W_G} - \frac{\sin B_1 - \sin B_0}{W_s - W_G} \right]$$

$$R_2(t) = (-A_G D_s)/(W_s) [\cos(W_s X_0 - W_s Vt + \Phi) - \cos(-W_s Vt + \Phi)]$$

$$R_3(t) = (-A_G D_s)/(W_G) [\cos(W_G X_0 + W_G Vt) - \cos(W_G Vt) B]$$

$$R_4(t) = D_s D_G X_0$$

and $$A_0 = (W_G - W_s) Vt + \Phi$$

$$B_0 = (W_G + W_s) Vt + \Phi$$

$$A_1 = (W_s + W_G) X_0 + (W_G - W_s) Vt + \Phi$$

$$B_1 = (W_s - W_G) X_0 - (W_G + W_s) Vt + \Phi$$

$X_0$ = limit of integration in $x$-direction

The foregoing analysis is based on sinusoidal signals of one frequency and amplitude. Since an image formed by a lens contains a whole spectrum of spatial frequencies, the above relationships need modification. The term that needs further development is the signal amplitude, $A_s$. This must be expressed as a function of frequency which can easily be done by making the following assumptions:

1. The information in any scene of interest contains all spatial frequencies in equal amounts (white noise).
2. The modulation transfer function of any lens is linear.

The above two simplifying assumptions permit expression of the modulation transfer function of the lens as $$MTF = 1.0 - F_s/F_{cut}$$

and the signal amplitude in the image as $$A_s = A'_s MTF = A'_s [1.0 - F_s/F_{cut}]$$

where $A'_s$ = constant
since white noise is assumed.

Since image motion, in practice, does not have any preferential direction, a one-dimensional analysis is rather elemental. If a ronchi ruling is used as the mask, the effective mask frequency, $F_G$, will have a peak when the motion is perpendicular to the lines of the mask and zero when the motion is parallel. This variation in $F_G$ produces variations in the electrical signal and these can not be differentiated from the variations due to the image velocity.

One possibility would be to use two crossed ronchi rulings as shown in FIG. 2b. The effective frequency would vary between the frequency of the mask, $F_G$, to $F_G/\sqrt{2}$ for motion along the diagonal.

Figure 3B:
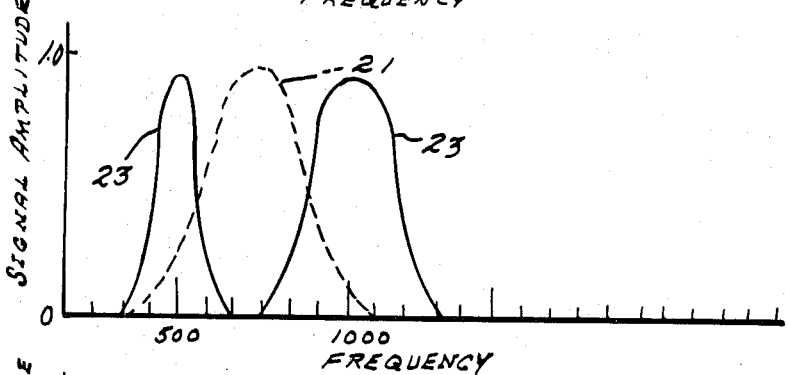
Figure 3C:
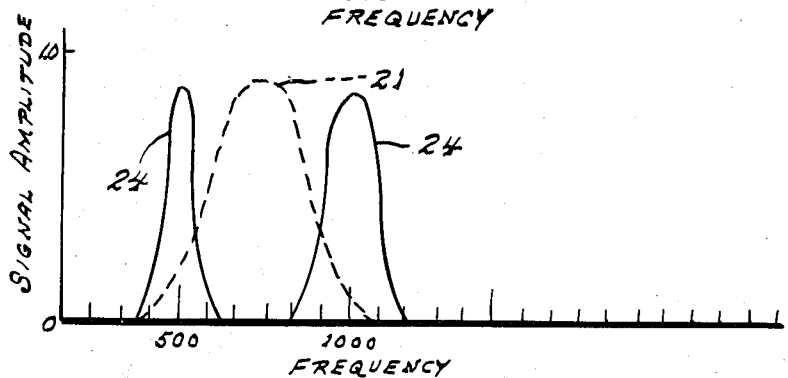
Figure 3D:
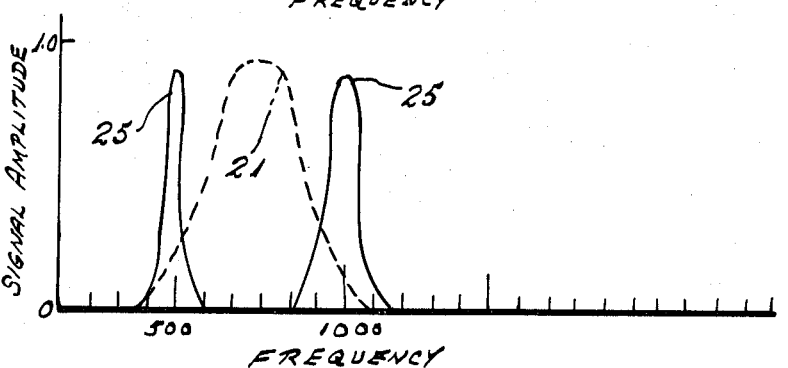

To detect variations in the velocity of the image, the electrical output is sampled at some time sampling interval $\Delta t$ by signal sampling circuit 17. This sampled signal is then passed through filter circuit 18. The amount of energy transmitted by the filter is a function of the velocity of the image. FIGS. 3a through 3d show four different spectra curves 22, 23, 24 and 25 for sampled signals generated by four different image velocities. The sampling rate is 0.001 seconds which is shown by the peak at 1,000 hertz. If the filter is designed, to have a band pass frequency indicated by dotted curve 21 as shown in the figure, the amount of energy passed by the filter is shown to increase as the velocity increases.

The variations in the amount of energy passed by the filter can be measured as voltage drops across a resistor in the resonant filter circuit. When an arbitrarily selected minimum voltage drop is detected, a signal may be generated to trip the shutter mechanism of the camera.

While the invention has been described in its preferred embodiments it is understood that the words which have been used are words of description rather than words of limitation and that changes within the purviewed of the appended claims may be made without departing from the scope and spirit of the invention in its broader aspects.

I claim:
1. A photographic system comprising:
   a camera having a photographic lens member,
   a camera operating mechanism,
   an image velocity detector operable through said photographic lens member and having an integrated output signal that is a continuous measure of image motion,
   and actuating means responsive to said image velocity detector output signal adapted to actuate said camera operating mechanism at a given output signal threshold value, said image velocity detector comprising a photodetector having a periodic transmission mask disposed over its light detecting surface, and, said actuating means including means for periodically sampling the output signal of said image velocity detector and an electronic filter having a frequency pass band adapted to permit actuation in response to signal samples representing minimum object motion only.

* * * * *